C. P. GARDNER.
SNAP HOOK.
APPLICATION FILED AUG. 31, 1915.
1,223,957.
Patented Apr. 24, 1917.
Fig. 1.
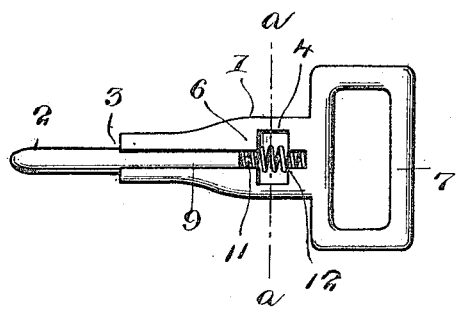
Fig. 2.
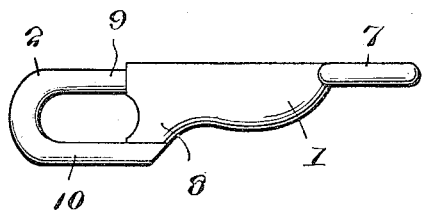
Fig. 5.
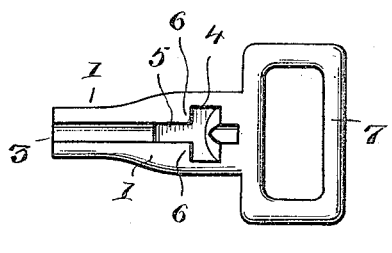
Fig. 3.
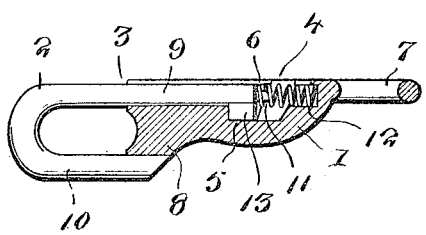
Fig. 4.
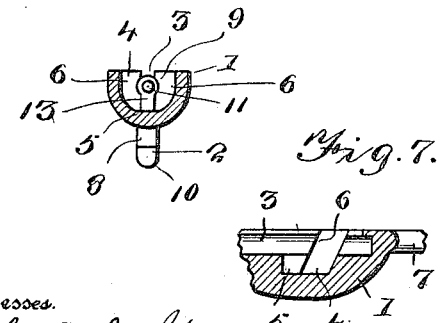
Fig. 6.
Fig. 7.
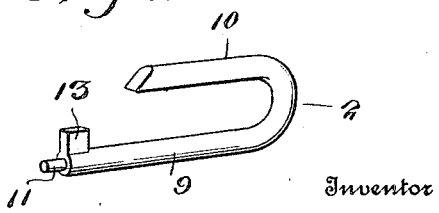
Witnesses.
John D. Spalding.
J. W. Garner
Inventor
Charles P. Gardner
By Victor J. Evans
Attorney

UNITED STATES PATENT OFFICE.

CHARLES PHILIP GARDNER, OF FORT RECOVERY, OHIO.

SNAP-HOOK.

1,223,957.  Specification of Letters Patent.  Patented Apr. 24, 1917.

Application filed August 31, 1915. Serial No. 48,234.

*To all whom it may concern:*

Be it known that I, CHARLES P. GARDNER, a citizen of the United States, residing at Fort Recovery, in the county of Mercer and State of Ohio, have invented new and useful Improvements in Snap-Hooks, of which the following is a specification.

This invention relates to improvements in snap hooks, for use on hitching-straps, harness and for other similar uses, the object of the invention being to provide an improved snap hook which is cheap and simple in construction and which is not likely to become casually disengaged.

The invention consists in the construction, combination and arrangement of devices hereinafter described and claimed.

In the accompanying drawings:—

Figure 1 is a plan of a snap hook constructed in accordance with my invention, partly in section.

Fig. 2 is an elevation of the same.

Fig. 3 is a longitudinal sectional view of the same.

Fig. 4 is a transverse sectional view of the same on the plane indicated by the line *a—a* of Fig. 1.

Fig. 5 is a detail plan of the body with the hook and spring removed.

Fig. 6 is a detail perspective view of the hook.

Fig. 7 is a detail longitudinal sectional view of the body.

The improved snap hook comprises a body 1 and a hook 2. The body which may be of the form here shown or of any other suitable form is provided with a longitudinal bore 3, open at the outer end and intersected at a point near its inner end by a transversely arranged chamber 4. In one side of the bore is a recess 5 which communicates with the chamber and camming shoulders 6 are formed at opposite sides of the chamber in the side walls thereof and which lead to opposite sides of the recess and are inclined as shown. At the outer end of the body is an eye 7, of suitable shape for the attachment of a strap or the like. The body is also provided at its inner end with an arm 8 which projects laterally therefrom.

The hook comprises a stem or shank 9 and a bill 10. The shank is arranged for longitudinal and also for revoluble movement in the bore of the body so that the bill can be arranged to close against and overlap the outer side of the arm 8 or to be swung from either side thereof to release the snap hook. At the inner end of the shank of the hook is a projection 11 which is engaged by a spring 12 that normally moves the hook outwardly. From one side of the shank at a point near its inner end, projects a cam stud 13 which normally enters the recess 5 and locks the hook in closed position. While the hook is in closed position and at the outer end of its movement of the spring, the lug 13 of the hook is in the recess 5 and the sides of said recess coact with said lug to prevent turning movement of the hook until after the hook has been moved inwardly a sufficient distance against the tension of the spring to cause the lug 13 to clear the recess 5. This prevents casual opening of the hook. To cause the hook to be opened or arranged in release position the hook must be moved inwardly a sufficient distance and turned pivotally to cause the front end of the cam lug or stud 13 to engage behind one of the camming shoulders 6. When the hook is released the spring acts to again move the same outwardly and hence the cam stud or lug 13 by reason of its engagement with one of the camming shoulders and its slidable movement thereon coacts with said camming shoulder to turn the hook back to normal locked position, said camming shoulder guiding the cam stud or lug 13 back again into the locking recess 5.

While I have herein shown and described a preferred form of my invention I would have it understood that changes may be made in the form, proportion and construction of the several parts without departing from the spirit of the invention and within the scope of the appended claim.

Having thus described my invention, I claim:—

A snap hook comprising a body having a longitudinal bore extending to one end and also having an arm on one side the said end, and the body being further provided with a transversely arranged chamber intersecting said bore near its inner end, a recess at one side of the bore and at the inner side of the chamber, and camming shoulders in rear of said recess and leading from opposite sides of the chamber to the rear end of said recess at opposite sides thereof, in combination with a hook having a shank mounted in the bore for longitudinal movement and also for partial rotation and a bill at the outer end of the shank to close against and overlap the outer side of the arm of the body, said hook also having a cam stud at one side and near the inner end of the shank to enter either side of the chamber behind one of the camming shoulders on rearward movement of the hook, and to also enter said recess when the hook is moved outwardly, and a spring to normally move the hook outwardly and thereby cause one of the camming shoulders to direct the cam stud into the recess between the camming shoulders and thereby cause the hook to be moved to and locked in closed position.

In testimony whereof I affix my signature in presence of two witnesses.

CHARLES PHILIP GARDNER.

Witnesses:
J. C. MOELLER,
W. VELTEN.